United States Patent
Rauch et al.

(10) Patent No.: US 6,318,056 B1
(45) Date of Patent: Nov. 20, 2001

(54) DEVICE FOR MONITORING THE INTAKE SUBASSEMBLY OF AN AGRICULTURAL HARVESTING MACHINE

(75) Inventors: Hans Rauch, Saulgau; Manfred Pollklas, Rheda-Wiedenbrück, both of (DE)

(73) Assignee: CLAAS Saulgau GmbH, Saulgau (DE)

( * ) Notice: Subject to any disclaimer, the term of this patent is extended or adjusted under 35 U.S.C. 154(b) by 0 days.

(21) Appl. No.: 09/437,571

(22) Filed: Nov. 10, 1999

(30) Foreign Application Priority Data

Nov. 11, 1998 (DE) ............................................. 198 54 562

(51) Int. Cl.⁷ .................................................. A01D 75/18
(52) U.S. Cl. ...................... 56/10.2 J; 56/10.3; 56/DIG. 6
(58) Field of Search ............................. 56/10.2 R, 10.2 J, 56/10.3, DIG. 6, DIG. 15, 51, 52, 60, 71, 500, 504, 505; 460/1, 2, 3; 340/684, 551; 192/224.1, 224.2, 12 R, 147

(56) References Cited

U.S. PATENT DOCUMENTS

| | | | |
|---|---|---|---|
| 3,959,953 | * 6/1976 | Garrott | 56/10.2 |
| 4,275,546 | 6/1981 | Bohman et al. | 56/10.2 |
| 4,286,424 | 9/1981 | Hubbard | 56/10.2 |
| 4,306,403 | 12/1981 | Hubbard et al. | 56/10.3 |
| 4,324,324 | * 4/1982 | Priepke et al. | 56/10.2 |
| 4,343,137 | * 8/1982 | Seymour | 56/10.2 |
| 4,496,105 | 1/1985 | Fleming et al. | 241/32 |
| 4,531,118 | * 7/1985 | Beams | 56/10.2 |
| 4,720,963 | 1/1988 | Weiss et al. | 56/10.2 |
| 4,727,353 | 2/1988 | Ruhter | 340/52 |
| 4,758,788 | * 7/1988 | Weiss et al. | 56/10.2 |
| 4,776,154 | 10/1988 | Weiss et al. | 56/10.2 |
| 5,092,818 | * 3/1992 | Bohman et al. | 460/2 |
| 5,558,163 | 9/1996 | Hollstein | 172/2 |
| 5,592,029 | 1/1997 | Hollstein et al. | 307/9.1 |
| 5,797,250 | * 8/1998 | Augie | 56/10.2 J |
| 5,819,512 | 10/1998 | Steffen et al. | 56/10.2 |
| 5,901,535 | * 5/1999 | Duckinghaus et al. | 56/10.2 G |
| 5,921,071 | 7/1999 | Paquet et al. | 56/16.6 |
| 6,105,347 | * 8/2000 | Behnke | 56/10.2 J |

FOREIGN PATENT DOCUMENTS

| | | |
|---|---|---|
| 27 30 031 | 1/1979 | (DE) . |
| 30 29 050 | 3/1981 | (DE) . |
| 2035029 | * 6/1980 | (GB) . |
| 2 058 254 | 4/1981 | (GB) . |

* cited by examiner

Primary Examiner—Robert E. Pezzuto
Assistant Examiner—Nathan Mammen
(74) Attorney, Agent, or Firm—Husch & Eppenberger, LLC; Robert E. Muir; Kevin M. Kercher

(57) ABSTRACT

An intake subassembly for an agricultural harvesting machine, in particular a self-propelled forage harvester for corn, grass and the like, including a cutting cylinder, feed rollers, and compression rollers, has a cut-out clutch for bringing the feed rollers and the compression rollers to a sudden stop. The machine may have a monitor system for detecting and processing information relating to the status and motion of the components of the subassembly and generating a signal to interrupt and brake the detected motion, for example, in response to the presence of foreign objects or overloads in the subassembly.

9 Claims, 2 Drawing Sheets

DEVICE FOR MONITORING THE INTAKE SUBASSEMBLY OF AN AGRICULTURAL HARVESTING MACHINE

FIELD OF THE INVENTION

The invention relates to agricultural harvesting machines having intake mechanisms, in particular, silage cutters or forage harvesters for corn, grass and the like, comprising a cutting cylinder mounted in a cylinder housing and rotatably driven by the main drive unit in the machine.

BACKGROUND OF THE INVENTION

Applicant is aware of U.S. Pat. Nos. 4,275,546; 4,286,424; 4,306,403; 4,496,105; 4,720,963; 4,776,154; 5,558,163; 5,592,029; 5,819;512 and. 5,921,071, the disclosures of which are incorporated by reference herein.

In machines of conventional design, the cutting cylinder typically has a switchable drive element connected thereto, and a drive train, for driving the rollers of an intake subassembly equipped with a foreign body detecting device. A reversing transmission unit for driving the intake subassembly in the reverse direction, and a cut-out clutch for bringing the intake subassembly to a sudden halt are mounted in the drive train. The cut-out clutch is moveable into one position for transferring the driving torque and into another position for blocking the rotation of the intake subassembly.

In conventional forage harvesters, the cutting cylinder is usually driven directly by the main drive system. The switchable drive element connected to the cutting cylinder may be a belt drive arrangement with a driving pulley fixed to the shaft of the cutting cylinder. The driven pulley is mounted on a shaft having a clutch at the opposite end thereof and this clutch is coupled to another clutch via toothed gears. The two clutches form part of the switchable transmission system and provides the forward and reverse rotation of the intake mechanisms of the forage harvester. The clutch on the cutting cylinder shaft also meshes with a gear wheel forming the input of a transmission unit. The cut-out clutch is also coupled to this transmission unit so that the rollers of the intake subassembly can be brought to a sudden stop should this be necessary. This transmission unit transfers the torque via further gears of the switchable transmission system to a shaft which applies the torque to a spur gear in order to drive the feed rollers and the compression rollers. A drive system of this type has the great advantage that, in the case where a rapid stop is needed due to the presence of a foreign body or an overload of the intake mechanism, the cutting cylinder of relatively large mass can continue to rotate, but the feed rollers and the compression rollers can be brought to a sudden stop. The masses subjected to braking are thereby kept as low as possible. In order to remove the foreign body or to disperse the overload on the intake mechanism, the rollers of the intake subassembly are driveable in the reverse direction.

The selection of the rotational direction of the intake subassembly may be controlled by the driver of the forage harvester by actuating switching elements in the driver's cab. If the intake subassembly is suddenly halted, the belt tensioner for the belt drive arrangement connected to the cutting cylinder is simultaneously moved by means of a hydraulic cylinder to relieve the tension on the belt. The whole intake subassembly is decoupled from the rotating cutting cylinder and comes to a sudden stop. Typically the feed rollers have to be reversed, to clear a foreign body, for example, and to deactivate the rapid-stopping device. For this purpose, a switching element may be actuated by the driver for switching over the reversing transmission unit and connecting up the belt drive arrangement. In general, a foreign body or an overload of the intake mechanism that caused the rapid-stoppage is fed out of the intake zone by the reversing process.

A method of disabling a spur-gear type reversing transmission unit is known from DE 30 29 050. The design of the drive system is such that a motor driven belt drive arrangement is used, inter alia, to drive a spur-gear type reversing transmission unit via a further belt drive arrangement, two electromagnetically operable clutches being arranged on the output shaft of this transmission unit. A spur gear connected to one clutch meshes with a spur gear on the input shaft and a spur gear associated with the second clutch likewise meshes with a spur gear mounted on the input shaft but via an intermediary gear. The purpose of this arrangement is to bring the rotating components to a complete halt in as short a time as possible. For this purpose, the two electromagnetically operable clutches are actuated simultaneously and the intake mechanism is blocked.

This prior drive arrangement is suitable for halting the rollers of the intake subassembly and the cutting cylinder in the event of an overload of the intake subassembly, as are conventional arrangements generally. In this case, there is substantially much more time available than is the case where the foreign body detecting device responds, if the device is to prevent the foreign body from entering the area swept by the cutting cylinder. If the two clutches of the prior device are actuated simultaneously, there is still a relatively large amount of run-on time available. The time needed to stop the rollers, upon the detection of a foreign body, may be too great to reliably prevent a foreign body from entering the area swept by the cutting cylinder.

SUMMARY OF THE INVENTION

The present invention provides an intake control system incorporating a monitor to control the state of the intake subassembly of an agricultural machine, such as a forage harvester. The monitor includes a sensor to detect motion of a component or components of the intake subassembly and generates a signal, which may be processed by a central controller, for example.

The monitoring device is capable of detecting movement in the intake subassembly, such as rotation of a component, and triggering a rapid stoppage of the rollers in the intake subassembly on the basis of the detected movement. If the driver of the harvesting machine initiates a rotation of the rollers in the working direction to continue harvesting, for example, or the reverse direction, the system will override the signal from the monitoring device and permit operation. The monitoring device is connected to the intake control system via a data bus, for example, to permit the signal from the monitor to be appropriately processed. It is advantageous if the monitoring device forms part of the intake control system, for example, by being integrated into the machine controller.

The controller may limit activating the rapid stoppage process to just one direction of rotation of the intake subassembly. This has the advantage that a crop overload caught between the rollers can be extracted in the reverse direction of rotation without triggering a rapid-stop action.

The monitoring device can also be integrated with the controller to undertake other monitoring functions or information-providing functions relating to the intake subassembly. Thus, for example, it is possible to detect when the whole of the rotating intake mechanism, or just parts thereof, have come to a halt after a stoppage has been initiated by the driver. The monitoring device may detect whether the rotational speed of the rollers in the intake subassembly is being reduced, or how long it takes before the rollers have come to a halt. The monitoring device may then generate a fault warning if a certain reduction in rotational speed is not achieved, or if the rollers have still not come to a standstill after a certain period of time.

Furthermore, following a rapid stop of the intake subassembly, information regarding the state of the cut-out clutch can be derived from the time taken to reach a halt. If this length of time should be greater than a given period, then a fault warning could be generated by the monitoring device.

The controller may be programmed to activate the monitoring device after the rollers have come to a stop, for example, after a shut down command.

The monitor system preferably incorporates at least one sensor for detecting the rotational speed of at least one component or drive member of the intake subassembly. The operational mode of the intake subassembly can then be derived from the other input variables to the intake control system. It is particularly advantageous if the input variables available to the intake control system can be used for the monitoring device so as to avoid the need for additional installations. However, a separate sensor may be introduced at any suitable location within the drive train which is connected to the switchable drive element driven by the cutting cylinder.

A further advantage is that existing machines can be retrofitted with a monitoring device and sensor, according to the invention.

The monitoring system may be designed such that an electrical signal is produced thereby, for moving the cut-out clutch into its blocking position, if a rotational movement of an intake subassembly component or a transmission member being monitored by the activated sensor is detected. The sensor may be associated with a drive member of a transmission unit located in the drive train for the intake subassembly, for example. The sensor is then accommodated within the transmission unit housing where it is protected from dirt and damage. If the sensor is associated with the output gear of the shift and reverse transmission unit, a compact construction is thereby obtained since the cut-out clutch is functionally associated with the shift and reverse transmission unit.

The sensor need not monitor just the stationary state of a transmission unit or a particular component, but it may also be used for determining the rotational speed of the rollers in an intake subassembly in order to calculate the length-of-cut of the foraged material, for example, this calculation may be performed in conjunction with the parameters of the cutting cylinder.

In accordance with the present invention, a monitoring device is provided in a system which includes the following: 1) a drive train; 2) at least one mechanism for shutting down an intake subassembly and moveable into a position for blocking the rotation of the intake subassembly or transferring drive torque; 3) a sensing device operationally connected to at least one of the following: a component of the intake subassembly and/or at least one component of the drive train.

The objects and advantages of the present invention, will become apparent from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
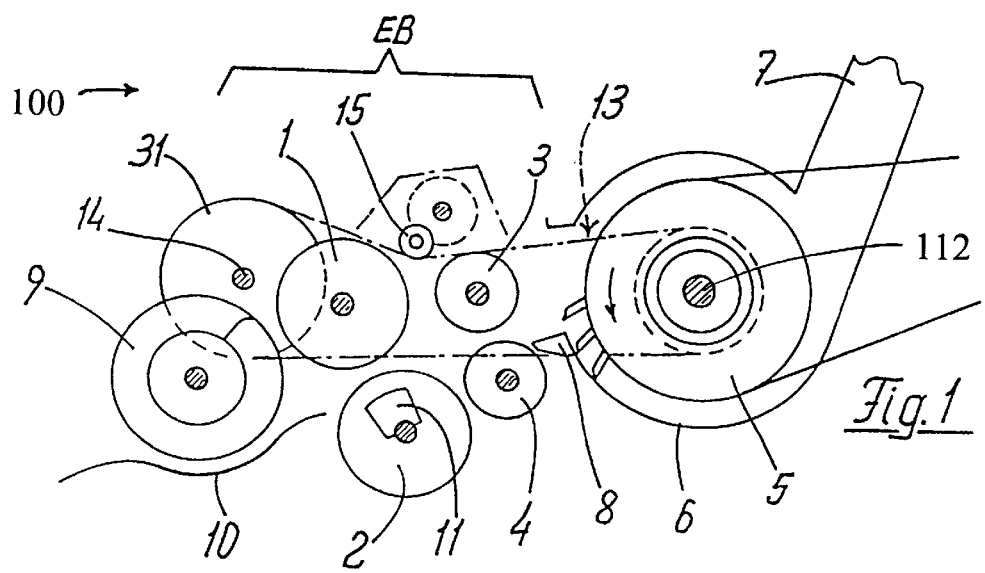
FIG. 1 is a schematic side view of the intake subassembly together with the preceding cross augers and the following cutting cylinder.
Figure 2:
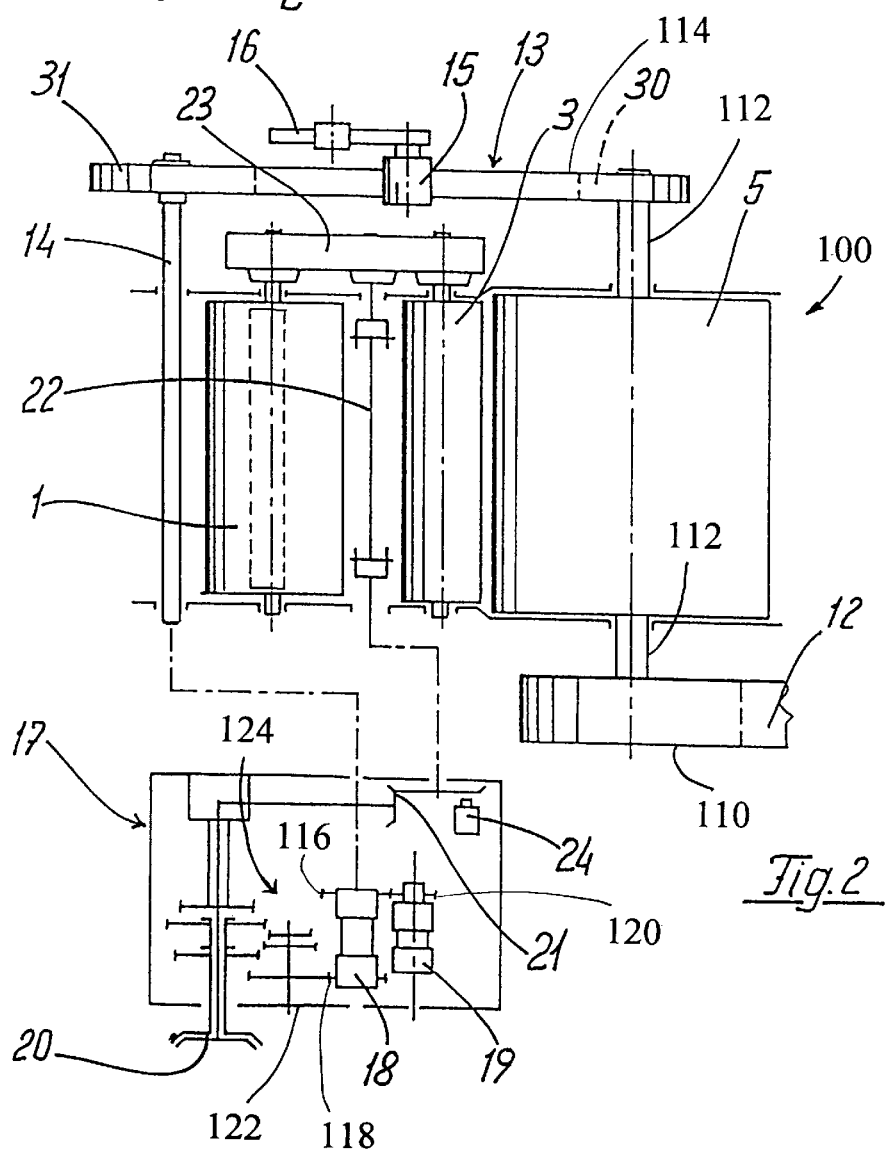
FIG. 2 is a partial top view of the mechanism shown in FIG. 1.

An intake subassembly 100 is shown in FIGS. 1 and 2. The remaining structure of the complete forage harvester, not shown, may be of conventional design. The intake subassembly 100 is equipped with two, parallel-axis feed rollers 1 and 2, and two following parallel-axis compression rollers 3, 4. The rotatable cutting cylinder 5, which is driven counter clockwise as seen in the illustration of FIG. 1, is arranged immediately behind the compression rollers 3, 4 in the direction of movement of the foraged crop. The cutting cylinder 5 is rotatably mounted in a cylinder housing 6, which may also be of conventional design. The rising conveyor shaft 7 for the foraged crop is attached to the cylinder housing 6. The fixed shear bar 8 is located between the compression rollers 3, 4 and the cutting cylinder 5 as shown. Two opposed cross augers 9, for supplying the material being foraged to the feed rollers 1, 2, are laterally disposed in front of the feed rollers 1, 2. A tray 10 is arranged below the cross augers 9, as shown in schematic in FIG. 1. A foreign body detecting device 11, preferably including a metal detector, is associated with the lower feed roller 2.

The drive for the cutting cylinder 5 is provided via, for example, belt drive arrangement 12 directly from the drive motor of the forage harvester, also not shown. This belt drive arrangement 12 is the main drive of the forage harvester subassembly 100. The appertaining driven pulley 110 is mounted at one end of the cutting cylinder shaft 112. The driving pulley 30 of another belt drive arrangement 13 is fixed to the opposite end of the shaft 112. The driven pulley 31, which is likewise mounted on shaft 14, is driven by means of this belt drive arrangement 13. The belt 114 in the belt drive arrangement 13 is tensioned and detensioned by means of an idler pulley 15. The idler pulley 15 can be pivoted into and out of position by means of a tension lever 16, which itself is pivotal by a hydraulic cylinder, not shown, driven by a convention source of pressurized fluid, as is known in the art.

The pulley 31 provides the drive for a shiftable transmission unit 17 via the shaft 14 as shown in schematic in FIG. 2. The rotational movement of the shaft 14 is conveyed to a controllable clutch 18 in the transmission unit 17. A second controllable clutch 19 is associated with the clutch 18. As is shown in FIG. 2, the first clutch 18 is equipped with two gears 116 and 118, shown in FIG. 2. Gear 116 engages a gear 120 on the second clutch 19 and gear 118 engages a gear 122 forming the input gear of a gear shift assembly 124. The direction of rotation of the transmission unit 17, which is a reversible transmission, can be shifted between the forward and reverse directions of rotation by means of the two clutches 18, 19 and the speed is determined by the gear assembly 124, as is known in the art. This gear assembly 124 is coupled to a cut-out clutch 20 which is illustrated in more detail in FIG. 4. The output member of the transmission unit 17 is a bevel gear set 21. This bevel gear set 21 drives a conventional drive unit 23, via a shaft 22, in order to drive the feed rollers 1, 2 and the compression rollers 3, 4. Drive unit 23 may be a belt and pulley arrangement, as shown in FIG. 2. A sensor 24 is installed near the bevel gear set 21 in the embodiment illustrated in FIG. 2.

In normal operation, the idler pulley 15 is pivoted into a position in which the feed rollers 1, 2 and the compression rollers 3, 4 are driven at constant speed via the previously described drive train and the crop is advanced towards the cutting cylinder 5. Should a foreign body be detected by the foreign body detecting device 11, then the feed rollers 1, 2 and the compression rollers 3, 4 are brought to an immediate stop by appropriate activation of the cut-out clutch 20. At the same time, the belt in the belt drive arrangement 13 is detensioned by pivoting the tension lever 16.

Should a foreign body or an overload of the intake subassembly 100 be detected, for example in the roller section EB, then the cut-out clutch 20 and/or the belt drive arrangement 13 can be actuated automatically or switched manually by the operator of the forage harvester, to decouple the drive to the output shaft 22 from transmission unit 17. In both of these cases, the operator of the forage harvester will then initiate a reversing process whereby the feed rollers 1, 2 and the compression rollers 3, 4 will be driven in the opposite rotational direction to expel any overload or foreign body from the subassembly 100. Should the cut-out clutch 10 not be activated, it will then be switched from its braking or blocking position into its engaged operational position. Due to the reversal of the direction of rotation of the cut-out clutch 20, the locking pawls 20a, 20b will be simultaneously released from the cams 33a, 33b thereby enabling them to rotate. The reversing process ends with the release of the idler pulley 15. Following this reversing process, the driver can visually confirm the clearance of material from the feed rollers 1, 2. In this state, switch 32 is now switched such that even the slightest rotation of the bevel gear set 21, in either direction of rotation, as detected by sensor 24, will immediately set off a signal so as to move the cut-out clutch 20 into its braking position. Thereafter, in order to continue operation the driver must restart the reversing process for a brief period so as to release the cut-out clutch 20 from its braking or blocking position and disengage switch 32.

Figure 3:
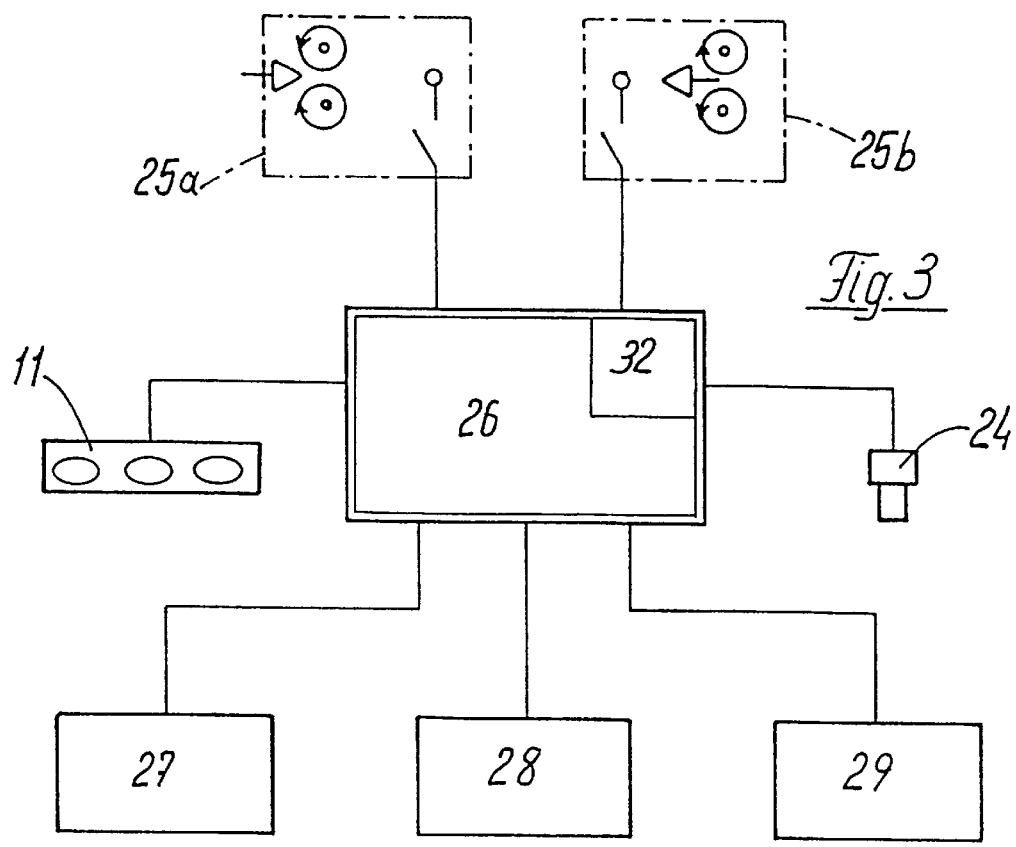
FIG. 3 is a block circuit diagram of the electrical arrangement.

FIG. 3 shows a block circuit diagram representing the operating system for portion EB of subassembly 100. Switching elements 25a, 25b are manually controlled by the driver, by switches located in the cab of the forage harvester, for example. These elements are used to cause the feed rollers 1, 2 and the compression rollers 3, 4 to rotate in their normal working direction or in the reverse rotational direction as indicated symbolically by the arrows, or else to stop them. The actuation of either of these elements 25a, 25b informs the intake control system 26 of the operational state that has been selected by the driver of the forage harvester. If the feed rollers and the compression rollers are stationary, then the actuation of the switching element 25a indicates that these rollers should be switched to rotate in the working direction. If, however, the switching element 25b is actuated while the feed rollers 1,2 and the compression rollers 3,4 are stationary, then they are switched to rotate in the reverse direction. If the feed rollers 1,2 and the compression rollers 3,4 are rotating in the working direction and the switching element 25b is actuated, then all rollers are disabled via the belt drive arrangement 13.

The intake control system 26 is also connected to the foreign body detecting device 11 and sensor 24. In the embodiment illustrated, the intake control system 26 also incorporates the sensing switch 32. The belt drive arrangement 13 is enabled or disabled by an electro-hydraulic control means 28, for example, including a hydraulic cylinder, not shown, and the belt tensioning device 15, 16. The direction of rotation of the feed rollers 1,2 and the compression rollers 3,4 is pre-selected by the intake control system 26 by means of a controller 27 for the clutch 19. The cut-out clutch 20 is actuated by a controller 29 in order to brake the feed rollers 1,2 and compression rollers 3,4 to a rapid stop.

The respective internal construction of the data bus system, the foreign body detector 11 and the control systems 26, 27, 28, 29, 32 are conventional.

Figure 4:
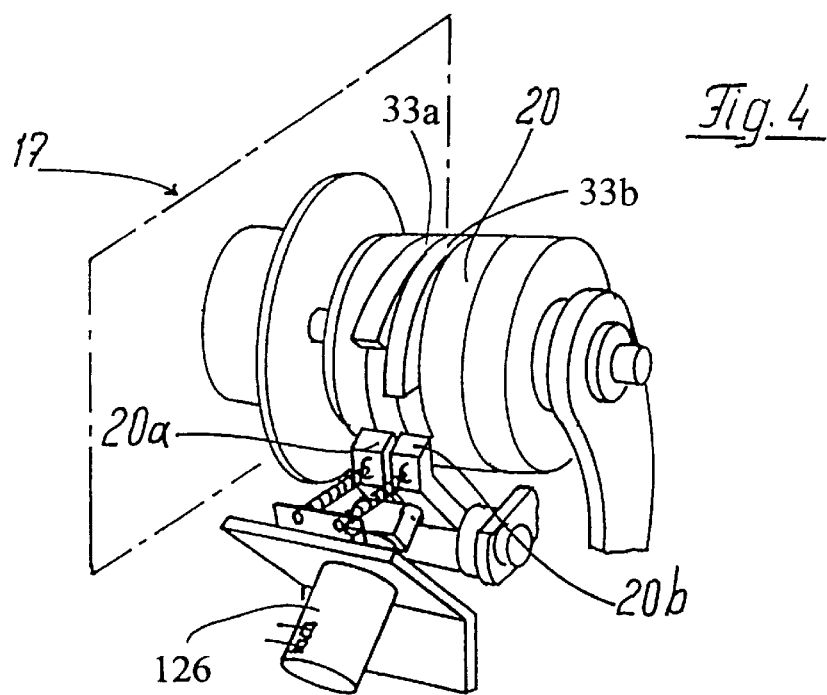
FIG. 4 is a perspective view of the cut-out clutch.

FIG. 4 shows the cut-out clutch 20. It is mounted directly on the outside of the transmission unit 17. The cut-out clutch comprises two locking pawls 20a, 20b which, in conjunction with the cams 33a, 33b, trigger off the rapid-stopping process for the rollers. Actuation of these locking pawls 20a, 20b is effected by means of a quick-acting solenoid 126 whereby the first pawl 20b opens the cut-out clutch 20 whilst the second pawl 20a stops the driven member of the intake subassembly portion EB.

The monitoring device can be used in connection with agricultural harvesting machines having an intake subassembly. However, it is fully clear to the person of ordinary skill in the art that the subject of the invention may also be used in other intake control systems incorporating a braking device.

While a preferred embodiment of the invention has herein been illustrated and described, this has been done by way of illustration and not limitation, and the invention should not be limited except as required by the scope of the appended claims and their equivalents.

We claim:

1. In a harvesting machine intake subassembly having a movable component; a drive train cooperating with the movable component to drive the movable component, the drive train having a movable element; and a drive interrupter, the drive interrupter being effective on actuation thereof to block operation of the intake subassembly, the improvement comprising; a monitor mechanism to detect motion of at least one of the movable component and the movable element with the monitor mechanism producing a shut down signal in response to detected motion; wherein at least one of the movable component and the movable element is rotatable; and wherein the monitor mechanism produces a shut down signal in response to detected rotating motion of at least one of the movable component and the movable element.

2. The device of claim 1 wherein the signal is communicated to an electronic control system.

3. In a harvesting machine intake subassembly having a movable component; a drive train cooperating with the movable component to drive the movable component, the drive train having a movable element; and a drive interrupter, the drive interrupter being effective on actuation thereof to block operation of the intake subassembly, the improvement comprising; a monitor mechanism to detect motion of at least one of the movable component and the movable element with the monitor mechanism producing a shut down signal in response to detected motion, wherein the subassembly includes an intake feed roller and a compression roller, wherein the monitor mechanism detects motion of at least one of the intake feed roller and the compression roller, and wherein rotational speed of the monitored roller is detected.

4. In a harvesting machine intake subassembly having a movable component; a drive train cooperating with the movable component to drive the movable component, the drive train having a movable element; and a drive interrupter, the drive interrupter being effective on actuation thereof to block operation of the intake subassembly, the improvement comprising; a monitor mechanism to detect motion of at least one of the movable component and the movable element with the monitor mechanism producing a shut down signal in response to detected motion; and wherein the monitor mechanism includes means for introducing a delay in producing the shut down signal.

5. The device of claim 4 wherein the monitor has means for generating a status signal determined by the delay in producing the shut down signal.

6. In a harvesting machine intake subassembly having a movable component; a drive train cooperating with the movable component to drive the movable component, the drive train having a movable element; and a drive interrupter, the drive interrupter being effective on actuation thereof to block operation of the intake subassembly, the improvement comprising; a monitor mechanism to detect motion of at least one of the movable component and the movable element with the monitor mechanism producing a shut down signal in response to detected motion; and wherein the intake subassembly has means for placing the intake subassembly and the drive train in a driving condition and means for placing the intake subassembly and drive train in an undriven condition, the monitor mechanism producing a shut down signal only when the subassembly and the drive train are in an undriven condition.

7. The device of claim 6 wherein the monitor mechanism produces a shut down signal when motion in an intake working direction is detected.

8. In a harvesting machine intake subassembly having a movable component; a drive train cooperating with the movable component to drive the movable component, the drive train having a movable element; and a drive interrupter, the drive interrupter being effective on actuation thereof to block operation of the intake subassembly, the improvement comprising; a monitor mechanism to detect rotational motion of at least one of the movable component and the movable element with the monitor producing a shut down signal in response to detected rotational motion; and wherein the intake subassembly includes an intake control system having an electronic controller and the monitor mechanism is effective to communicate the shut down signal to the electronic controller.

9. An intake subassembly for a harvesting machine comprising a set of feed rollers, a set of compression rollers, and a cutting cylinder; the intake subassembly being effective to receive harvested crop material, feed the crop material to the compression rollers, compress the crop material and cut the crop material to a comminuted condition; the subassembly having a drive train effective to move the subassembly components in a cooperating relationship, the drive train having a shut down mechanism to rapidly interrupt the movement of the subassembly components, the shut down mechanism including a brake effective to block rotation of at least some of the subassembly rollers when driven movement of the subassembly components is shut down, the subassembly further including an electronic monitor effective to monitor movement of at least some of the subassembly components, the electronic monitor including a sensor to detect rotational movement of a roller of the subassembly; the sensor being effective to generate an electronic signal in response to detected rotation; the subassembly further having a controller, the sensor communicating the electronic signal to the controller and the controller being effective to processing the electronic signal and transmit an effective control to the brake in response to the signal whereby rotational movement of at least one of the rollers is rapidly interrupted when driven movement is shut down by the shut down mechanism.

* * * * *